United States Patent
Kaelberer

(10) Patent No.: US 11,946,782 B2
(45) Date of Patent: Apr. 2, 2024

(54) OPTICAL POSITION-MEASURING DEVICE FOR SUPPRESSING DISTURBING HIGHER DIFFRACTION ORDERS

(71) Applicant: DR. JOHANNES HEIDENHAIN GmbH, Traunreut (DE)

(72) Inventor: Thomas Kaelberer, Schrobenhausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 17/960,148

(22) Filed: Oct. 5, 2022

(65) Prior Publication Data

US 2023/0120787 A1 Apr. 20, 2023

(30) Foreign Application Priority Data

Oct. 20, 2021 (DE) ...................... 10 2021 211 814.3

(51) Int. Cl.
*G01D 5/347* (2006.01)

(52) U.S. Cl.
CPC .............................. *G01D 5/34715* (2013.01)

(58) Field of Classification Search
CPC ... G01D 5/34715; G01D 2205/90; G01D 5/38
USPC ....................................... 250/221, 234, 235
See application file for complete search history.

(56) References Cited

U.S. PATENT DOCUMENTS

| 5,264,915 | A | * | 11/1993 | Huber | ...................... G01D 5/38 356/399 |
| 7,796,272 | B2 | | 9/2010 | Holzapfel | |
| 9,303,980 | B2 | | 4/2016 | Holzapfel et al. | |
| 11,313,672 | B2 | | 4/2022 | Kaelberer | |
| 2009/0135388 | A1 | | 5/2009 | Makinouchi et al. | |
| 2011/0164238 | A1 | * | 7/2011 | Yoshimoto | .......... G03F 7/70733 355/72 |
| 2020/0363193 | A1 | * | 11/2020 | Kaelberer | .............. G01B 11/14 |

FOREIGN PATENT DOCUMENTS

| EP | 0590162 A1 | 4/1994 |
| EP | 2848899 A2 | 3/2015 |
| EP | 2857901 A1 | 4/2015 |

(Continued)

*Primary Examiner* — Thanh Luu
*Assistant Examiner* — Mai Thi Ngoc Tran
(74) *Attorney, Agent, or Firm* — LEYDIG, VOIT & MAYER, LTD.

(57) ABSTRACT

An optical position-measuring device for determining a relative position of scales includes a light source, the scales and a detector. The scales are movable relative to each other along measurement directions and disposed in different planes in crossed relation to each other, and each have a graduation having grating regions which are arranged periodically and have different optical properties. At the first scale, the illumination beam is split into sub-beams, the sub-beams subsequently impinge on the second scale and are reflected back toward the first scale, and the reflected-back sub-beams strike the first scale again, where they are recombined, so that a resulting signal beam subsequently propagates toward the detector. The measuring graduation of one or more of the scales is configured as a two-dimensional cross grating which has a filtering effect that suppresses disturbing higher diffraction orders.

20 Claims, 8 Drawing Sheets

(56) References Cited

FOREIGN PATENT DOCUMENTS

| EP | 3059554 A1 | 8/2016 |
| EP | 3477264 A1 | 5/2019 |
| EP | 3739300 A1 | 11/2020 |
| WO | WO 2008138501 A1 | 11/2008 |

* cited by examiner

OPTICAL POSITION-MEASURING DEVICE FOR SUPPRESSING DISTURBING HIGHER DIFFRACTION ORDERS

CROSS REFERENCE TO RELATED APPLICATIONS

This application claims benefit to German Patent Application No. DE 10 2021 211 814.3, filed on Oct. 20, 2021, which is hereby incorporated by reference herein.

FIELD

The present invention relates to an optical position-measuring device capable of measuring with high accuracy the position of two objects that are movable relative to each other along at least two measurement directions. Here, the two objects are connected to respective scales.

BACKGROUND

Optical position-measuring devices based on interferential scanning principles are known where an illumination beam is split by diffraction at a measuring graduation of a scale into different sub-beams which then traverse a scanning beam path and impinge on one or more further scales. Upon recombination of suitable sub-beams, periodic signals are generated in a detection unit in response to a displacement of the scale relative to another scale due to the interference of the two sub-beams. By counting the signal periods in the detection unit, it is possible to infer the amount of displacement of the two scales or of the objects connected to the scales.

Optical position-measuring devices of this kind are used, for example, for high-accuracy position measurements in the semiconductor industry where, for instance, exposure masks for photolithography are moved relative to a wafer at velocities of more than one meter per second. In this process, positioning accuracies in the range of a few nanometers and less must be maintained. A decisive advantage of grating-based position-measuring devices over interferometers is that the interfering sub-beams need to travel only very short distances. Thus, they are hardly affected by environmental influences, such as variations in air pressure, in temperature, and in moisture, which could corrupt the measurement, for example, because of a varying refractive index of the air.

WO 2008/138501 A1 describes an optical position-measuring device that includes two crossed scales which each have measuring graduations that include periodically arranged lines or grating regions disposed transversely to the common measurement direction. The position-dependent signals are generated using an interferential scanning principle. Such a position measuring device allows the position of a stage that is movable in two directions to be determined with high accuracy along a first measurement direction x, independently of the position of the stage along another, second measurement direction y. If two such position-measuring devices are used which are disposed orthogonally to each other, then the position of the stage can also be measured along the second measurement direction y, this time independently of the position of the stage along the first measuring direction x.

Furthermore, U.S. 2009/0135388 A1 describes a comparable arrangement with an interferential optical position-measuring device, which is used to determine the position of a movable stage in a semiconductor manufacturing apparatus in a horizontal plane of movement relative to a tool. A wafer, for example, may be disposed on the stage; the tool may be an exposure lens. In the example of FIG. 6B, a first scale configured as a two-dimensional grating is mounted on the movable stage; a second scale is also configured as a two-dimensional grating and is disposed stationary relative to the first scale. An arrangement of this kind can be used to determine the movement of the stage in a horizontal xy-plane of movement.

Interferential scanning of scales generally results in position errors which are also referred to as interpolation errors and which affect the measurement accuracy in an undesired manner. The two documents cited do not reveal any measures that would be suitable to minimize such position errors or interpolation errors in optical position-measuring devices having crossed scales.

SUMMARY

In an embodiment, the present invention provides an optical position-measuring device for determining a relative position of at least two scales. The optical position-measuring device includes a light source, the at least two scales and a detector. The light source is configured to emit an illumination beam along a scanning beam path. The at least two scales are movable relative to each other along at least two measurement directions and disposed in different planes in crossed relation to each other, and each have at least one measuring graduation having grating regions which are arranged periodically along at least one of the measurement directions and have different optical properties. Each of the at least two scales have a direction of longitudinal extent oriented parallel to a first or a second one of the measurement directions. The detector is configured to generate one or more position-dependent scanning signals with respect to relative movement of the scales along the first or second measurement direction. The scanning beam path is configured such that: at the first scale, the illumination beam is split into at least two sub-beams, the at least two sub-beams subsequently impinge on the second scale and are reflected back toward the first scale, and the reflected-back sub-beams strike the first scale again, where the reflected-back sub-beams are recombined, so that at least one resulting signal beam subsequently propagates toward the detector. The at least one measuring graduation of at least one of the scales is configured as a two-dimensional cross grating which has a filtering effect that suppresses disturbing higher diffraction orders at the cross grating

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5b is a partial cross-sectional view of the first variant of the cross grating from FIG. 5a;

FIGS. 5c-5e are partial cross-sectional views of modifications of the first variant of the cross grating from FIG. 5a;

DETAILED DESCRIPTION

Figure 1:
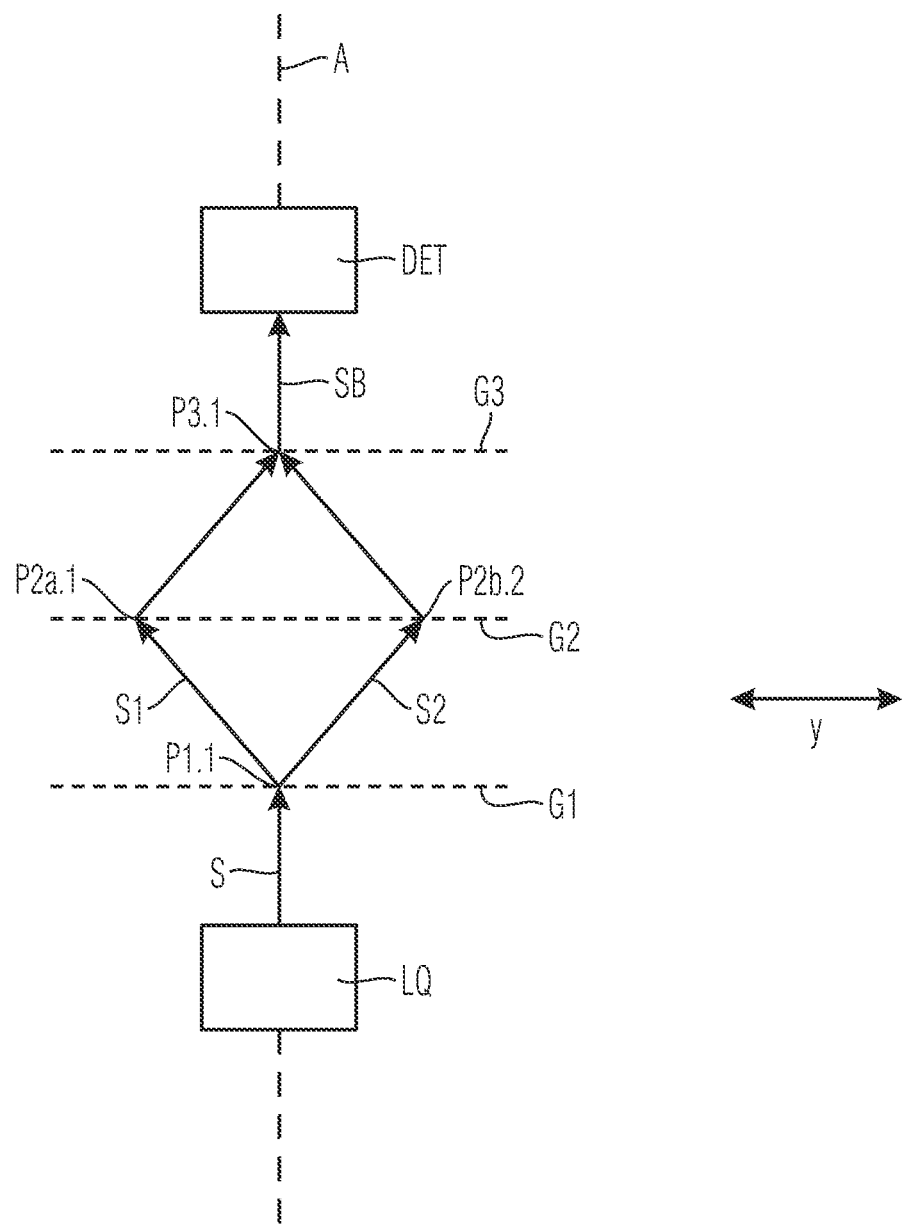
FIG. 1 is a view illustrating the unfolded scanning beam path in an exemplary embodiment of the optical position-measuring device according to the invention.

In an embodiment, the present invention provides a highly accurate optical position-measuring device having crossed scales that allows for position measurement with the smallest possible position errors.

The optical position-measuring device according to an embodiment of the invention is used to sense the relative position of at least two scales which are movable relative to each other along two measurement directions and disposed in different planes in crossed relation to each other. The two scales each have at least one measuring graduation having grating regions which are arranged periodically along at least one measurement direction and have different optical properties. The directions of longitudinal extent of the scales are each oriented parallel to a first or a second measurement direction. At the first scale, an illumination beam emitted from a light source is split into at least two sub-beams. The sub-beams subsequently impinge on the second scale and are reflected back toward the first scale. The reflected-back sub-beams strike the first scale again, where they are recombined, so that at least one resulting signal beam subsequently propagates toward a detector, which is capable of generating one or more position-dependent scanning signals with respect to the relative movement of the scales along the first or second measurement direction. The measuring graduation of at least one scale is configured as a two-dimensional cross grating which has a filtering effect that suppresses disturbing higher diffraction orders at the cross grating.

The cross grating may have first and second areal measuring graduation regions which are arranged in a checkerboard-like pattern and have different optical properties and which are arranged periodically with a first regional periodicity along the direction of longitudinal extent and periodically with a second regional periodicity along a direction of transverse extent of the cross grating that is oriented orthogonally to the direction of longitudinal extent, the first and second areal measuring graduation regions having superimposed thereon a one-dimensional or two-dimensional periodic line grating.

In each areal measuring graduation region, the line grating may have a line grating region which
includes at least a first pair of straight grating lines which extend over the entire length of the areal measuring graduation region and are arranged parallel to a first direction of extent at a first distance relative to each other, and in the case of a two-dimensional line grating, further includes a second pair of straight grating lines which extend over the entire length of the areal measuring graduation region and are arranged along a second direction of extent, which is oriented perpendicular to the first direction of extent, at a second distance relative to each other, the line grating regions along the first direction of extent having the same periodicities as the areal measuring graduation regions of the cross grating, and in the case of a two-dimensional line grating, the line grating regions along the second direction of extent also having the same periodicities as the areal measuring graduation regions of the cross grating.

Preferably, it is provided that at least three regions separated from one another by the grating lines be present in each of the areal measuring graduation regions along the first direction of extent and/or along the second direction of extent.

The different optical properties provided in the cross grating may be different transmission properties and/or
different reflective properties and/or
different phase-shifting effects.

In a possible embodiment, the cross grating may be configured as a binary grating having two different optical properties, and the grating lines of the line grating may in each case have the respective other optical property with respect to the optical properties of the first and second areal measuring graduation regions.

Furthermore, the cross grating may have spacing regions between the first and second areal measuring graduation regions, the spacing regions having a third optical property different from the optical properties of the first and second areal measuring graduation regions.

The spacing regions between the first and second areal measuring graduation regions may have identical widths along the direction of longitudinal extent and along the direction of transverse extent.

Furthermore, the spacing regions may be patterned.

Moreover, a measuring graduation of the second scale may be configured as a reflective linear grating having measuring graduation regions which are arranged periodically along the direction of longitudinal extent of the second scale and which have different phase-shifting effects on the beams reflected thereby.

The linear grating of the second scale may have a filtering effect that suppresses certain diffraction orders $n>1$.

Furthermore, it may be provided that at least one of the measuring graduations be further configured such that the diffraction orders generated thereby each have a defined polarization.

Advantageously, at least one of the scales is disposed such that it is tilted about its direction of longitudinal extent.

In an arrangement including a stage, a plurality of optical position-measuring devices according to an embodiment of the invention may be provided, wherein:

the stage being disposed in a horizontal plane of movement in such a manner that it is movable along two orthogonal measurement directions, and two first scales being disposed at opposite sides of the stage, and at least one second scale being disposed crosswise at an angle of 90° and stationary with respect to the two first scales in a plane that is spaced apart from the horizontal plane of movement along a direction that is oriented orthogonally to the plane of movement, and a plurality of scanning units being disposed stationarily adjacent to the opposite sides of the stage with the first scales, each scanning unit including a light source and a detection unit.

In this connection, it may be provided that:

the two first scales each have a reflective measuring graduation in the form of a two-dimensional cross grating, which are disposed such that they are tilted about their directions of longitudinal extent with respect to the horizontal plane of movement, and the second scale have at least two reflective measuring graduations in two parallel tracks that extend parallel to the direction of longitudinal extent, the measuring graduations being configured as reflective linear gratings having graduation regions which are arranged periodically along the respective direction of longitudinal extent, and the grating planes of the reflective measuring graduations being oriented parallel to the horizontal plane of movement.

The measures according to embodiments of the invention make it is possible to significantly reduce position errors in optical position-measuring devices having crossed scales. It can be ensured that position measurement is performed with high accuracy.

Such position-measuring devices are particularly suitable, for example, for measuring the movement of a stage in a horizontal plane of movement. They can be used to measure with high accuracy translational movements of the stage along two linear measurement directions in the plane of movement, as well as rotational movement of the stage about an axis of rotation perpendicular to the plane of movement.

Further details and advantages of embodiments of the present invention will be described in the following description of exemplary embodiments of the inventive device in conjunction with the figures.

Before describing in detail an exemplary embodiment of the inventive position-measuring device and several variants of suitable measuring graduations, first, an exemplary scanning beam path for such a position-measuring device will be described with reference to FIG. 1, which shows the scanning beam path in unfolded form.

The illumination beam S emitted from a light source LQ initially strikes a first scale having a grid-like first measuring graduation G1. At the point of incidence P1.1 on the first scale; i.e., on the measuring graduation G1 thereof, illumination beam S is split into two sub-beams S1, S2. The two sub-beams S1, S2 then impinge at points of incidence P2*a*.1 and P2*b*.2 on a second scale having a second grid-like measuring graduation G2. There, sub-beams S1, S2 are each diffracted back toward a central axis of symmetry A of the overall system shown. At point of incidence P3.1, the two sub-beams S1, S2 then strike a third scale having third measuring graduation G3, where they are recombined. After the two sub-beams S1, S2 are diffracted at point of incidence P3.1 on third measuring graduation G3, at least one resulting signal beam SB containing two interfering diffraction orders of sub-beams S1, S2 then propagates toward a detection unit DET. In the event that second measuring graduation G2 moves relative to the two measuring graduations G1, G3 along measurement direction y, this detector can generate one or more position-dependent scanning signals characterizing a change in the relative position of measuring graduation G2 with respect to measuring graduations G1, G3.

The unfolded scanning beam path illustrated in FIG. 1, which includes different first and third scales and measuring graduations G1, G3, corresponds to a transmitted-light scanning arrangement where all measuring graduations G1, G2, G3 are configured as transmission gratings. Alternatively, such a scanning beam path may, of course, also be configured as a reflected-light scanning arrangement having a second measuring graduation G2 in the form of a reflection grating. In this case, the first and third scales and, respectively, first and third measuring graduations G1, G3, are configured identically; i.e., G1=G3. Accordingly, after reflection at second measuring graduation G2, first measuring graduation G1 is illuminated a further time. In this connection, first and third measuring graduations G1, G3 may be configured as reflection gratings or as transmission gratings.

The practical implementation of such an optical scanning principle in an exemplary embodiment of an inventive position-measuring device having measuring graduations disposed in crossed relation to each other will be described below with reference to FIGS. 2*a* and 2*b*. In the illustrated example, a reflected-light scanning arrangement having identically configured first and third measuring graduations is implemented.

The respective position-measuring device includes a first scale 30 mounted on a first object 10. Object 10 is disposed to be movable in a plane along two measurement directions x, y which are oriented orthogonally relative to each other The direction that is orthogonal to this plane is hereinafter referred to as direction z. The direction of longitudinal extent $R_{L1}$ of first scale 30 is oriented parallel to measurement direction y. First scale 30 has disposed thereon a reflective measuring graduation 31 having grating regions with different optical properties along at least one measurement direction x, y. In the present example, the first measuring graduation is configured as a two-dimensional cross grating which has a filtering effect that suppresses disturbing higher diffraction orders at the cross grating. The different grating regions of first measuring graduation 31 have different phase-shifting effects on the beams reflected thereby; i.e., the cross grating is configured as a reflection phase grating. A detailed description of the cross grating that is decisive for the desired reduction of position errors in the inventive position-measuring device will be given hereinafter in the description.

A second scale 40 is mounted on a stationary second object 20 in stationary and crosswise relation with respect to first scale 30 in a plane that is spaced apart along the z-direction. The direction of longitudinal extent $R_{L2}$ of second scale 40 is oriented parallel to measurement direction x. Second scale 40 also has disposed thereon a reflective measuring graduation 41 having grating regions with different optical properties along at least one measurement direction x, y. In the example shown, second measuring graduation 41 is formed by a linear grating having rectangular measuring graduation regions which are arranged periodically along the direction of longitudinal extent $R_{L2}$ of second scale 40 and which have different phase-shifting effects on the beams reflected thereby. Accordingly, in this exemplary embodiment, second measuring graduation 41 is configured as a reflection phase grating.

In the illustrated exemplary embodiment of the inventive position-measuring device, there is further provided a scanning unit 50, also in stationary relation with respect to first scale 30. Provided in scanning unit 50 is a light source and a detector. It is not absolutely necessary that the light source and the detector be disposed directly in scanning unit 50. It is also possible to space these components apart from scanning unit 50, and to feed the respective beams from the light source via optical waveguides to scanning unit 50 and from scanning unit 50 via optical waveguides to the detector. In such an embodiment, detector 50 is merely a passive unit and as such includes only the respective optical waveguides whose in-coupling and out-coupling surfaces function as a light source and a detector, respectively.

Figure 2A:
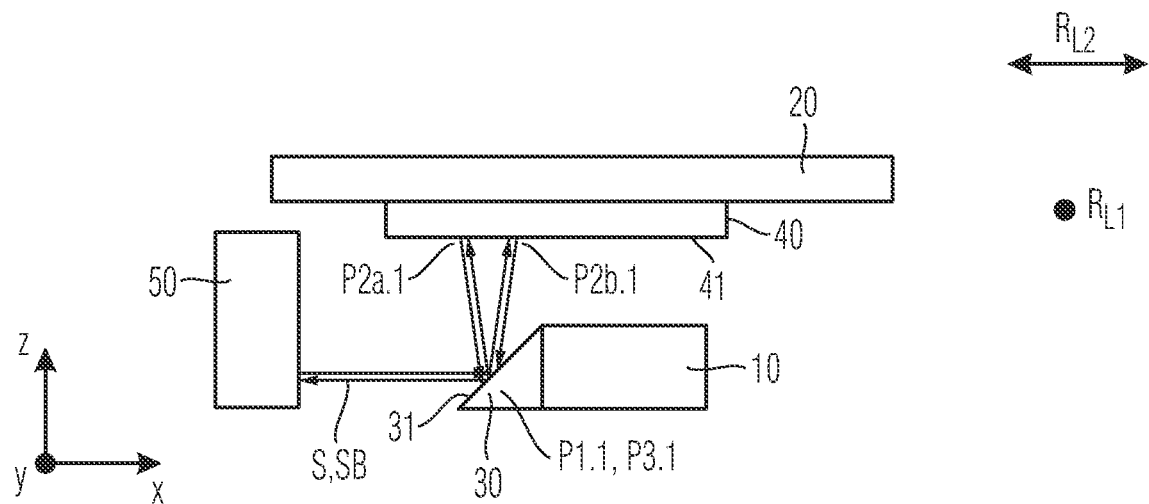
FIGS. 2a, 2b are partial views of an inventive position-measuring device that has crossed scales and uses a scanning principle according to FIG. 1.
Figure 2B:
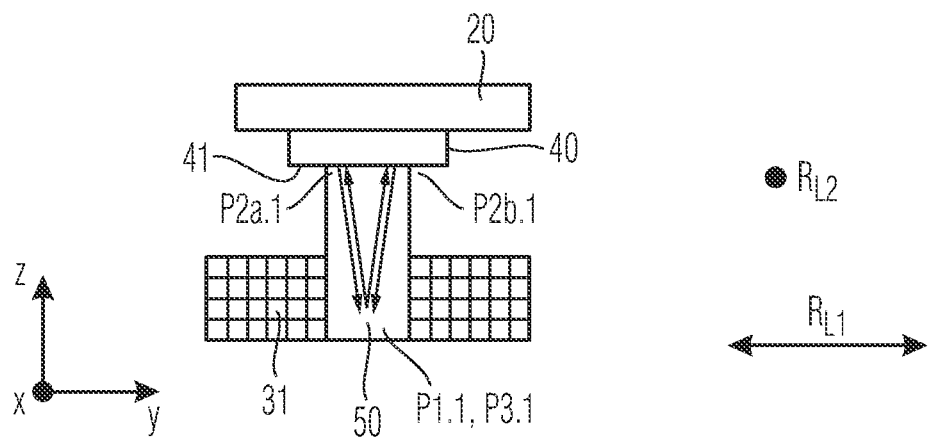

In accordance with the scanning beam path shown highly schematically in FIGS. 2*a*, 2*b*, the beam S incident from the light source or from scanning unit 50 is split into two sub-beams of +/−1$^{st}$ diffraction orders symmetrically to the z-direction at point of incidence P1.1 of first measuring graduation 31. The two sub-beams then strike second measuring graduation 41 at points of incidence P2*a*.1, P2*b*.1, where they are diffracted in such a manner that they propagate anti-parallel to the respective incident sub-beams back toward first measuring graduation 31. As mentioned above, in the present reflected-light system, the third illuminated measuring graduation is identical to first measuring graduation 31. There, the sub-beams are recombined at point of incidence P3.1, which is here identical to first point of incidence P1.1. Subsequently, a resulting signal beam SB containing at least one pair of interfering sub-beams propagates back toward the detector disposed in scanning unit 50.

Figure 3A:
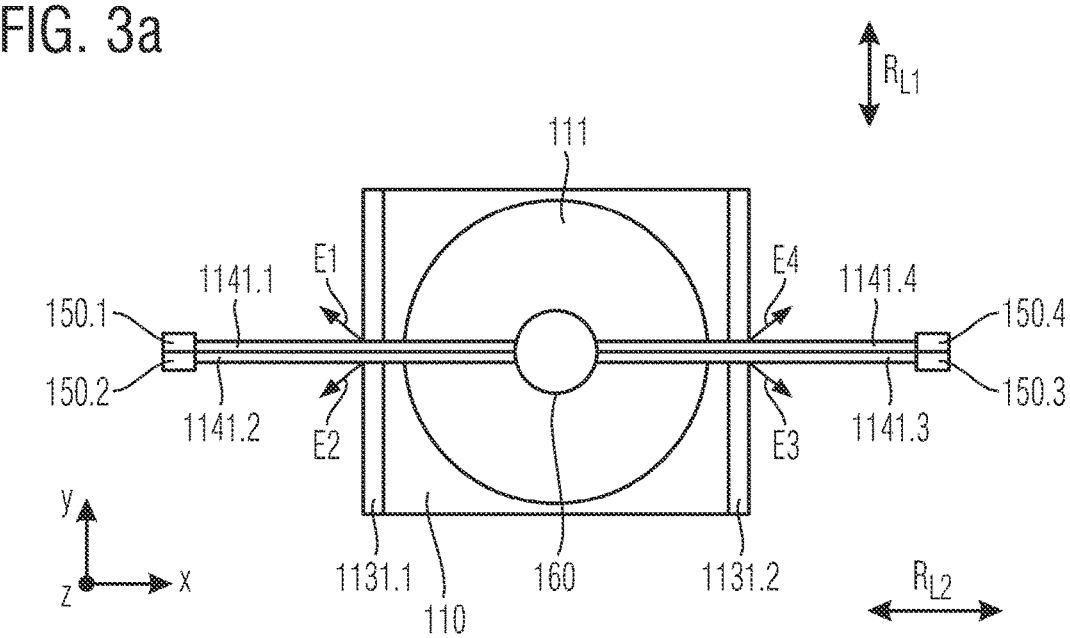
FIGS. 3a, 3b are plan and sectional side views of an arrangement including four inventive optical position-measuring devices according to FIGS. 2a, 2b.
Figure 3B:
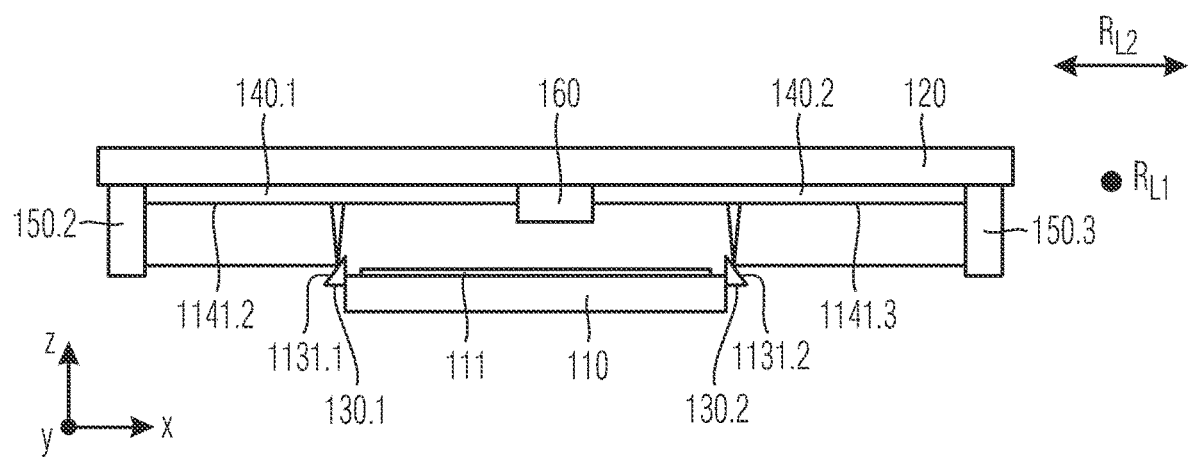

FIGS. 3*a* and 3*b* show, highly schematically, an arrangement which includes four position-measuring devices designed in accordance with an embodiment of the invention according to FIG. 2*a*, 2*b*, and which is used to determine the position of an object that is movable in the xy-plane. The movable object may be, for example, a stage 110 of a semiconductor manufacturing apparatus or a semiconductor inspection apparatus, the stage being positioned relative to a stationary object in the form of a machine frame 120 on which a tool 160 is mounted. Located on stage 110 is a wafer 111 which is processed using a tool 160 in the form of, for example, an exposure lens, or inspected using a tool 160 in the form of a microscope. In the present arrangement, translations of stage 110 along measurement directions x, y and rotational movements of stage 110 about the z-direction perpendicular thereto can be measured using the four position-measuring devices designed in accordance with an embodiment of the invention.

First scales 130.1, 130.2 having reflective first measuring graduations 1131.1, 1131.2 are respectively mounted on stage 110 at two opposite sides thereof, the scales 130.1, 130.2 being tilted approximately 45° about their respective directions of longitudinal extent $R_{L1}$ The tilt of the two scales 130.1, 130.2 is selected to cause the thereby diffracted sub-beams to be deflected symmetrically with respect to the z-direction.

As for the arrangement of first scales 130.1, 130.2 and first measuring graduations 1131.1, 1131.2 along the z-direction, care must also be taken to position them on stage 110 in such a manner that the first points of incidence of the various scanning beams of the four inventive position-measuring devices are at the level of the wafer 111 located on stage 110. In this way, position measurement can be performed with respect to wafer 111 without resulting in Abbé errors.

The two second scales 140.1, 140.2 with the respective two reflective second measuring graduations, as well as four scanning units 150.1-150.4 of the four inventive position-measuring devices, are in turn mounted on the stationary object in the form of machine frame 120.

The reflective second measuring graduations disposed on the two second scales 140.1, 140.2 in respective two parallel tracks are each configured as a linear grating, the linear gratings having graduation regions arranged periodically along the respective direction of longitudinal extent $R_{L2}$. The grating planes of the linear gratings are disposed parallel to the horizontal plane of movement of the stage in the xy-plane. The schematically indicated tool 160 is also connected to the stationary object or machine frame 120.

Figure 4:
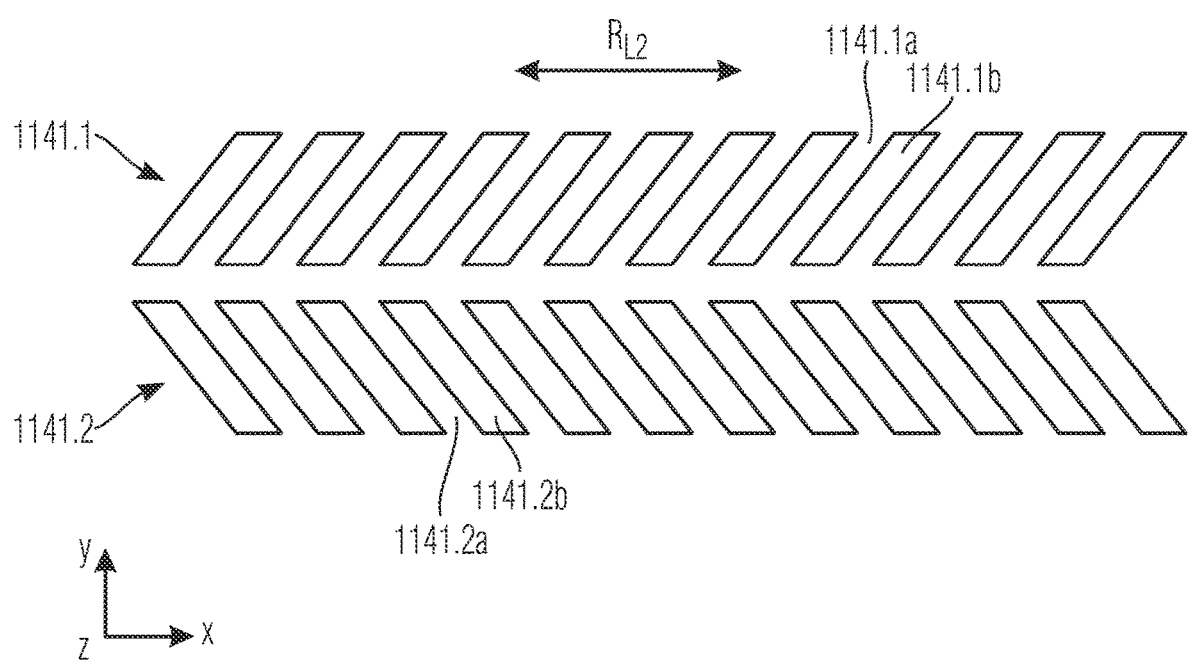
FIG. 4 is a plan view of a suitable second measuring graduation of the optical position-measuring device according to an embodiment of the invention.

FIG. 4 shows a plan view of one of the two second scales, 140.1, with the second measuring graduations 1141.1, 1141.2 disposed thereon in two parallel tracks and configured as a linear grating 141.1. As can be seen therefrom, measuring graduation regions 1141.1*a*, 1141.1*b* and 1141.2*a*, 1141.2*b* are arranged periodically along the direction of longitudinal extent $R_{L2}$ of the second scale in the two respective tracks. In the present example, the direction of longitudinal extent $R_{L2}$ of the second scale coincides with measurement direction y. As is also apparent from FIG. 4, the respective graduation regions 1141.1*a*, 1141.1*b* and 1141.2*a*, 1141.2 are arranged in the two tracks in V-shaped relation to each other; i.e., respective oppositely disposed graduation regions 1141.1*a*, 1141.1*b* and 1141.2*a*, 1141.2 from the two tracks form an angle of +α and −α, respectively, with respect to the direction of longitudinal extent $R_{L2}$. The respective measuring graduation regions 1141.1*a*, 1141.1*b* and 1141.2*a*, 1141.2*b* of the two measuring graduations 1141.1, 1141.2 have different phase shifts; i.e., the two second measuring graduations 1141.1, 1141.2 are configured as reflection phase gratings.

In the arrangement shown, the four position-measuring devices according to an embodiment of the present invention have respective sensitivity vectors E1-E4 in the xy-plane, symbolized in FIG. 3 by respective arrows. The sensitivity vector indicates the direction of movement in which the position signal of the respective measurement direction x, y exhibits the fastest increase per unit length traveled. The actual movement in the desired measurement directions x, y can be obtained by arithmetically combining the two periodic scanning signals obtained per scanning unit. With regard to the concept of the sensitivity vector in optical position-measuring devices, reference is additionally made to the publication EP 2 857 901 A1.

In the arrangement shown, a first position-measuring device is formed by the first scanning unit 150.1, the first scale 130.1 with the first measuring graduation 1131.1 at the left side of stage 110, as well as the second scale 140.1 with a second measuring graduation 1141.1 at the left side of stage 110; the associated sensitivity vector is designated E1 in FIG. 3*a*. A second position-measuring device includes the second scanning unit 150.2, the first scale 130.1 with the first measuring graduation 1131.1 at the left side of stage 110, as well as the second scale 140.1 with a second measuring graduation 1141.2; the associated sensitivity vector is designated E2. Accordingly, the first and second position-measuring devices use the same measuring graduation 1131.1 on first scale 130.1.

A third position-measuring device is formed by the third scanning unit 150.3, the first scale 130.2 with the first measuring graduation 1131.2 at the right side of stage 110, as well as the second scale 140.2 with a second measuring graduation 1141.3; the associated sensitivity vector is designated E3 in the figure. A fourth position-measuring device includes the fourth scanning unit 150.2, the first scale 130.2 with the first measuring graduation 1131.2 at the right side of stage 110, as well as the second scale 140.2 with a further second measuring graduation 1141.4; the associated sensitivity vector is designated E4. Accordingly, the third and fourth position-measuring devices use the same measuring graduation 1131.2 on first scale 130.2.

In accordance with FIG. 3a, the sensitivity vectors E1, E2 of the first and second position-measuring devices are oriented orthogonally to each other, just as are the sensitivity vectors E3, E4 of the third and fourth position-measuring devices. In the xy-plane, the sensitivity vectors E1-E4 of the fourth position-measuring devices each form an angle of 45° with respect to measurement directions x, y.

As mentioned earlier herein, the design of the respective first measuring graduation in the respective optical position-measuring devices according to an embodiment of the invention is decisive for the avoidance of undesired measurement errors in the respective optical position-measuring devices according to an embodiment of the invention. As also mentioned hereinabove, the respective first measuring graduations 31, 131.1 in the exemplary embodiments of FIGS. 2a, 2b and 3a, 3b are each configured as a reflective cross grating in the form of a reflection phase grating having specific filtering properties.

Figure 5A:
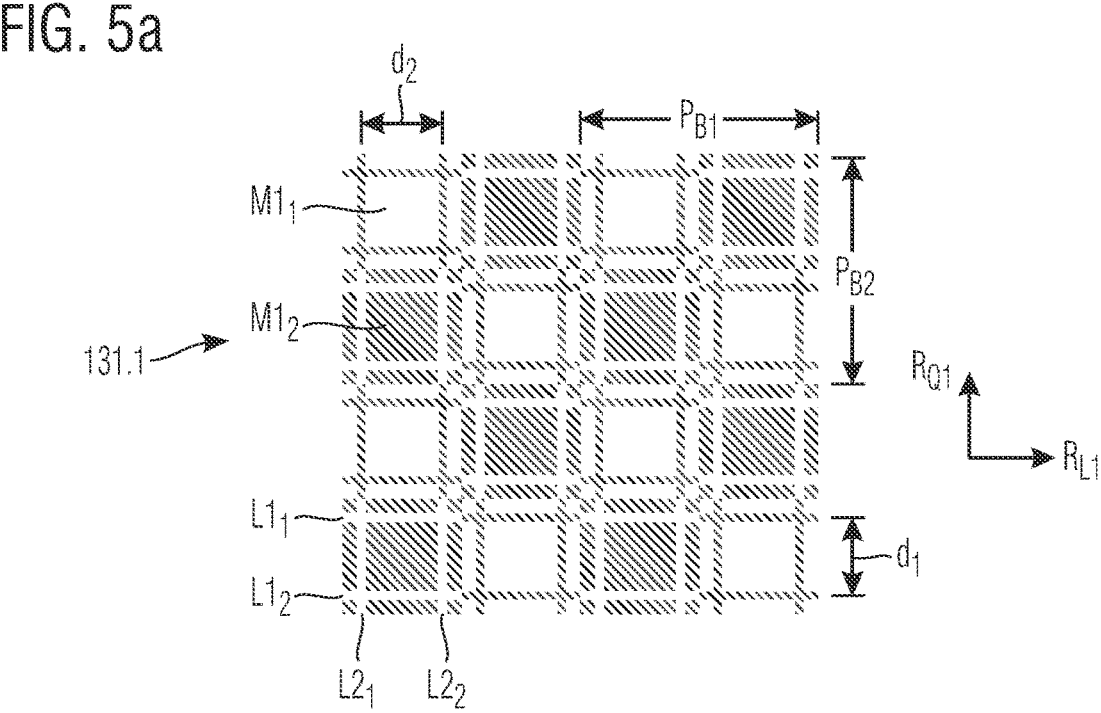
FIG. 5a is a plan view of a first variant of a suitable cross grating for the optical position-measuring device according to an embodiment of the invention.
Figure 5B:
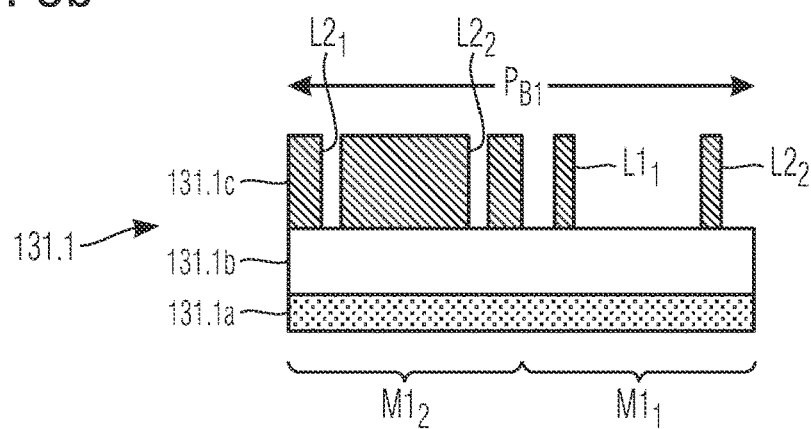

A first variant of a suitable cross grating 131.1 for the first measuring graduation is partially shown in a plan view in FIG. 5a and in a partial cross-sectional view in FIG. 5b. Before describing a possible grating structure of the first cross grating variant with reference to the partial cross-sectional view, first, the underlying grating design will be described with reference to the plan view in FIG. 5a. Further modifications of the grating configuration of the first cross grating variant will be subsequently described with reference to the partial cross-sectional views in FIGS. 5c-5e.

As can be seen from FIG. 5a, the cross grating 131.1 used as the first measuring graduation has first and second areal measuring graduation regions $M1_1$, $M1_2$ which are arranged in a checkerboard-like pattern and have different optical properties. First and second areal measuring graduation regions $M1_1$, $M1_2$ are arranged periodically with a first regional periodicity $P_{B1}$ along the direction of longitudinal extent $R_{L1}$ of cross grating 131.1 and periodically with a second regional periodicity $P_{B2}$ along a direction of transverse extent $R_{Q1}$ of cross grating 131.1 that is oriented orthogonally to the direction of longitudinal extent $R_{L1}$. The first measuring graduation regions $M1_1$, shown bright in the figure, exert a different phase-shifting effect on the reflected beams than the second measuring graduation region $M1_2$ shown in hatching; i.e., measuring graduation regions $M1_1$, $M1_2$ have different phase shifts 41 and 42. Accordingly, the different optical properties of the first and second areal measuring graduation regions $M1_1$, $M1_2$ are here provided in the form of different phase-shifting effects.

In this variant, a two-dimensional periodic line grating is superimposed on the first and second areal measuring graduation regions $M1_1$, $M1_2$ of cross grating 131.1. In each areal measuring graduation region $M1_1$, $M1_2$, the respective line grating in turn has a line grating region including a first and a second pair of straight grating lines $L1_1$, $L1_2$ and $L2_1$, $L2_2$. The first pair of straight grating lines $L1_1$, $L1_2$ extends over the entire length of the areal measuring graduation regions $M1_1$, $M1_2$ and is arranged parallel to the direction of longitudinal extent $R_{L1}$ with a first distance $d_1$ between grating lines $L1_1$, $L1_2$. The second pair of straight grating lines $L2_1$, $L2_2$ also extends over the entire length of the areal measuring graduation regions $M1_1$, $M1_2$ and is arranged parallel to the direction of transverse extent $R_{Q1}$ with a second distance $d_2$ between grating lines $L2_1$, $L2_2$. Thus, the first pair of grating lines $L1_1$, $L1_2$ is oriented orthogonally to the second pair of grating lines $L2_1$, $L2_2$. The line grating regions along the direction of longitudinal extent $R_{L1}$ and along the direction of transverse extent $R_{Q1}$, respectively, have the same periodicities $P_{B1}$, $P_{B2}$ as the areal measuring graduation regions $M1_1$, $M1_2$ of cross grating 131.1. Thus, in such a cross grating design, at least three regions separated by grating lines $L1_1$, $L1_2$ or $L2_1$, $L2_2$ are present in each of the individual areal measuring graduation regions $M1_1$, $M1_2$ along the direction of longitudinal extent $R_{L1}$ and along the direction of transverse extent $R_{Q1}$.

The line grating superimposed on the areal measuring graduation regions $M1_1$, $M1_2$ of the cross grating 131.1 functioning as the first measuring graduation forms a so-called "superstructure," which is decisive for the desired suppression of the disturbing higher diffraction orders. The disturbing higher diffraction orders that are suppressed include, inter alia, the following: (+/−2, +/−1), (+/−1, +2), (+/−3, 0), (0, +/−3). In contrast, a cross grating composed only of the areal measuring graduation regions $M1_1$, $M1_2$ arranged in a checkerboard-like pattern produces significantly more higher diffraction orders which result in errors in the position determination.

In the exemplary embodiment of FIG. 5a, the cross grating 131.1 used as the first measuring graduation is configured as a binary grating. This means that cross grating 131.1 has different regions with only two different optical properties. In the illustrated example, these are the hatched and the bright regions in cross grating 131.1, which have different phase-shifting effects on the beams reflected thereby. Such a binary grating can be fabricated in a single lithography process and is therefore relatively economical and simple to manufacture.

As is apparent from the figure, the grating lines $L1_1$, $L1_2$, $L2_1$, $L2_2$ of the line grating in each case have the other optical property; i.e., the optical property complementary to the respective optical property of the first and second areal measuring graduation regions $M1_1$, $M1_2$. For example, in an areal first measuring graduation region $M1_1$ shown bright and having the phase shift Δ1, grating lines $L1_1$, $L1_2$, $L2_1$, $L2_2$ have the complementary phase shift Δ2, and in the areal second measuring graduation regions $M1_2$ shown in hatching and having the phase shift Δ2, grating lines $L1_1$, $L1_2$, $L2_1$, $L2_2$ have the complementary phase shift Δ1.

In an alternative variant of the filtering cross grating 131.1, for example of FIG. 5a, it may be provided that the superimposed periodic line grating be one-dimensional instead of two-dimensional. This means that provision is for example made for only one line grating having the grating lines $L2_1$ and $L2_2$, which are arranged along a first direction of extent, for example the direction of longitudinal extent $R_{L1}$. Then, it is only along the first direction of extent that at least three regions separated from one another by grating lines $L2_1$, $L2_2$ are present in each of the individual areal measuring graduation regions $M1_1$, $M1_2$. The grating lines $L1_1$ and $L1_2$ provided in FIG. 5a along a second direction of extent, namely, the direction of transverse extent $R_{Q1}$, are omitted in such a variant. The first and second directions of extent are oriented perpendicularly to each other and, in the present example, correspond to the direction of longitudinal extent $R_{L1}$ and the direction of transverse extent $R_{Q1}$. Alternatively, it would in principle also be possible to arrange a one-dimensional line grating only along the second direction of extent; i.e., along the direction of transverse extent $R_{Q1}$.

In FIG. 5b, the filtering cross grating 131.1 of FIG. 5a is shown in a partial cross-sectional view, with reference to which the layer structure of this example will be described hereinafter. This figure, as well as the following views, each show a sectional view within a first regional period $P_{B1}$ including two adjacent first and second areal measuring graduation regions $M1_1$, $M1_2$. The present cross grating 131.1 has a reflective layer 131.1a which extends continuously over the entire surface area of the cross grating and is made of, for example, aluminum (Al) or chromium (Cr). A dielectric layer 131.1b is disposed thereabove, also continuously over the entire surface area, and may be made of, for example, silicon dioxide ($SiO_2$). Disposed above dielectric layer 131.1b is a patterned layer 131.1c, which includes a suitable reflective material in the regions shown in hatching. Examples of reflective materials that may be used include high refractive index dielectric materials, semiconductor materials such as silicon (Si), germanium (Ge), or also metals such as gold (Au), silver (Ag) or aluminum (Al).

Figure 5C:
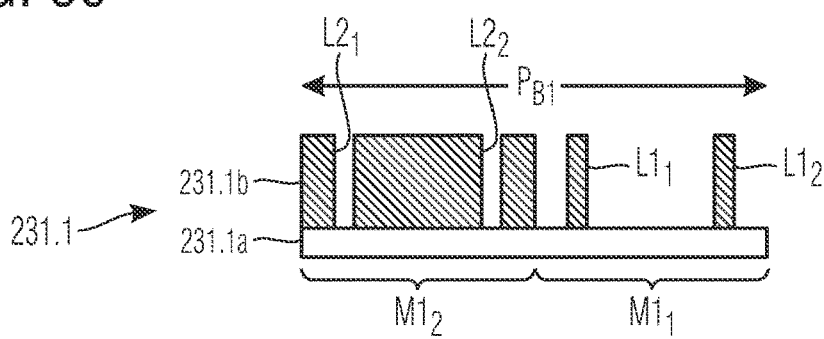

FIG. 5c shows, in a partial cross-sectional view, a modified layer structure for a filtering cross grating 231.1, again configured as a binary grating. Here, a patterned layer 231.1b, which includes a suitable reflective material in the regions shown in hatching, is disposed directly on a substrate 231.1a made of, for example, quartz glass or Zerodur. Here too, the reflective materials that may be used include high refractive index dielectric materials, semiconductor materials such as silicon (Si), germanium (Ge), or also metals such as gold (Au), silver (Ag) or aluminum (Al).

Figure 5D:
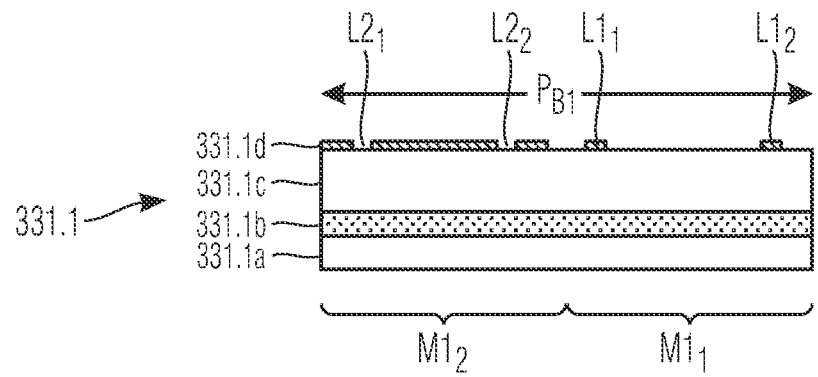

A further modification for a filtering cross grating 331.1 is shown in FIG. 5d in a partial cross-sectional view. A metallic reflective layer 331.1b is disposed on and over the entire surface area of a substrate 331.1a made of, for example, quartz glass or Zerodur. Reflective layer 331.1b extends over the entire surface area of the cross grating and may be made of aluminum (Al) or gold (Au). A dielectric layer 331.1c made of, for example, silicon dioxide ($SiO_2$) is disposed thereabove, also continuously over the entire surface area. Disposed thereabove is a patterned layer 331.1d, where again, a suitable reflective material, such as gold (Au), silicon (Si), tantalum pentoxide ($TaO_5$) or silicon nitride ($Si_3N_4$), is arranged in the regions shown in hatching.

Figure 5E:
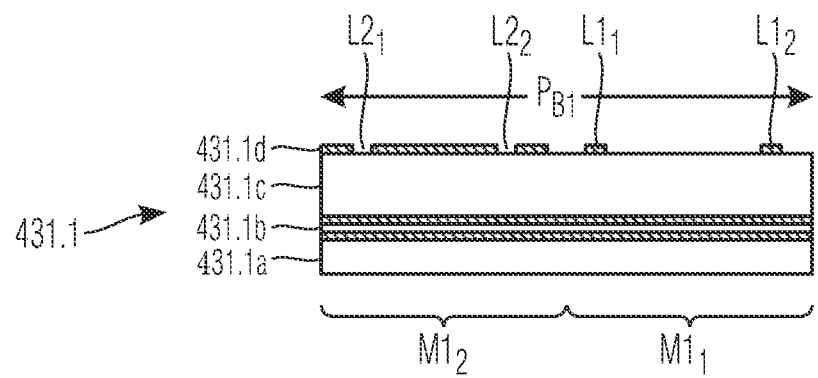

A still further modified layer structure for a suitable filtering cross grating 431.1 is shown in FIG. 5e in a partial cross-sectional view. Here, in contrast to the example of FIG. 5d, a dielectric mirror layer 431.1b formed by a stack of a plurality of individual dielectric layers is provided on substrate 431.1a over the entire surface area thereof instead of the reflective layer. High refractive index materials, such as titanium dioxide ($TiO_2$), tantalum pentoxide ($TaO_5$), and low refractive index material such as silicon dioxide ($SiO_2$) may be provided for the individual layers, the materials being arranged in alternating relationship. As in the previous example, a dielectric layer 431.1c and a patterned layer 431.1d are disposed thereabove. An example of a material that may be used for dielectric layer 431.1c is silicon dioxide ($SiO_2$). The patterned layer may be made of titanium dioxide ($TiO_2$), silicon or tantalum pentoxide ($TaO_5$).

Figure 6A:
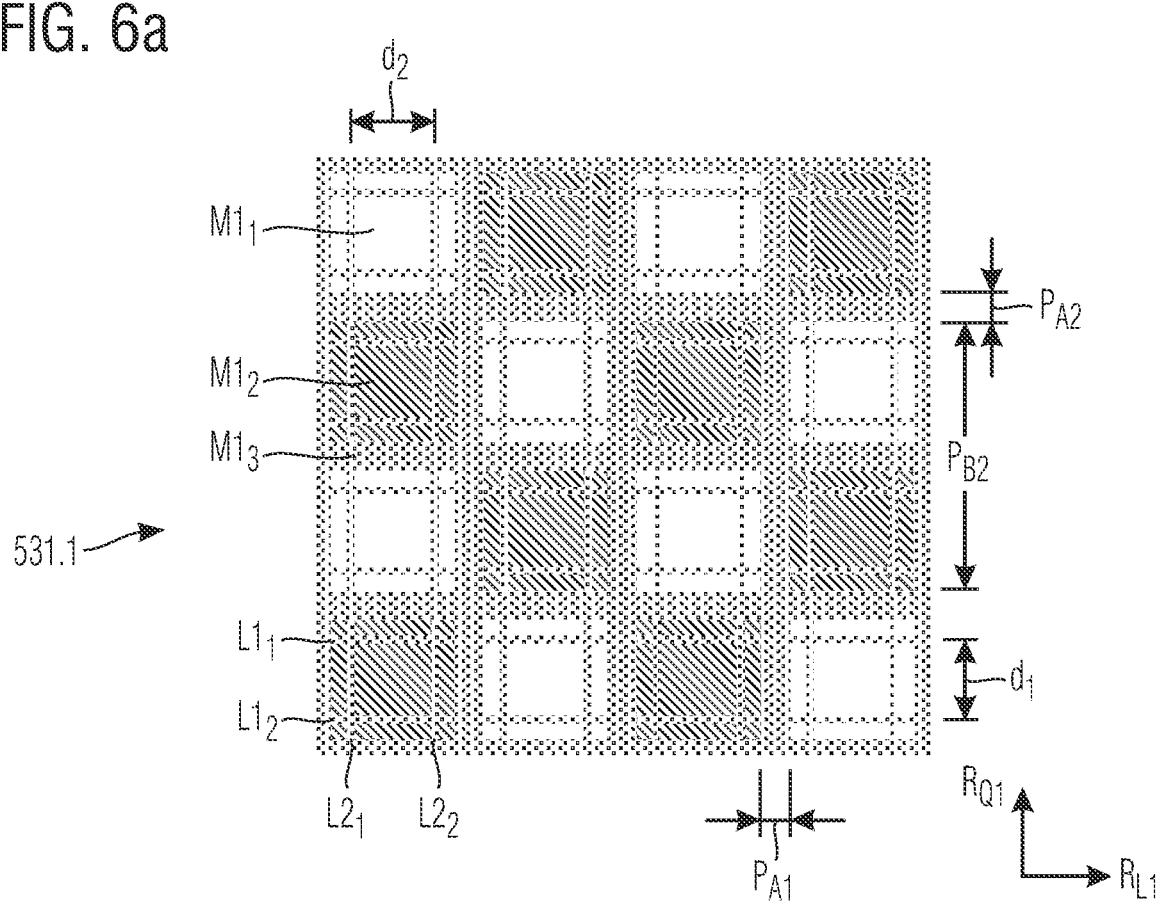
FIG. 6a is a plan view of a second variant of a suitable cross grating for the optical position-measuring device according to an embodiment of the invention.
Figure 6B:
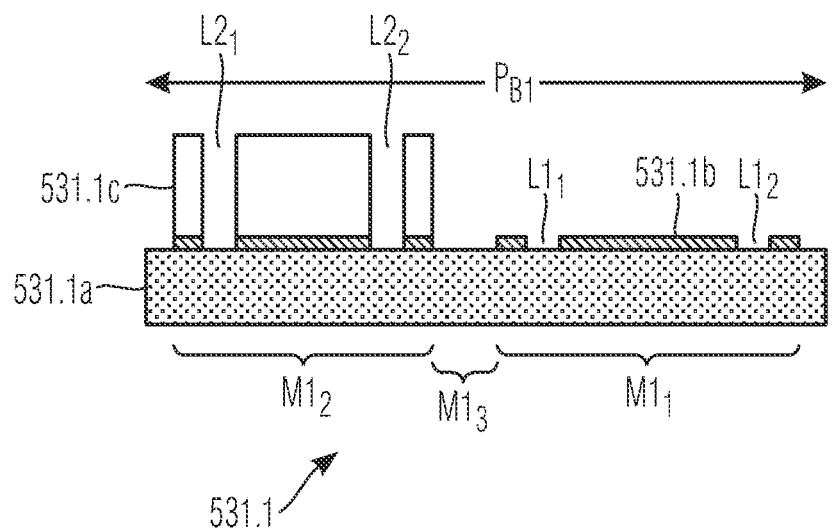
FIG. 6b is a partial cross-sectional view of the second variant of the cross grating.

A second variant of suitable cross gratings 531.1 for the first measuring graduation is shown in the plan view in FIG. 6a and in a partial cross-sectional view in FIG. 6b. Again, before describing the grating structure with reference to the partial cross-sectional view in FIG. 6b, first, the basic grating design will be described with reference to the plan view in FIG. 6a. In this connection, essentially only the relevant differences from the first cross grating variant of FIG. 5a will be discussed.

This variant of a filtering cross grating 531.1 that is usable as a first measuring graduation basically also has first and second areal measuring graduation regions $M1_1$, $M1_2$ which are arranged in a checkerboard-like pattern and have two different optical properties, a two-dimensional line grating having the grating lines $L1_1$, $L1_2$, $L2_1$, $L2_2$ being superimposed thereon, as in the example of FIG. 5a. However, in this cross grating 531.1, additional spacing regions $M1_3$ are provided between first and second areal measuring graduation regions $M1_1$, $M1_2$. Spacing regions $M1_3$ have a third optical property that differs from the optical properties of first and second areal measuring graduation regions $M1_1$, $M1_2$ in terms of reflectivity and/or phase shift. Accordingly, if the first and second areal measuring graduation regions $M1_1$, $M1_2$ have different phase-shifting effects with the phase shifts $\Delta 1$, $\Delta 2$, then spacing regions $M1_3$ have a phase shift $\Delta 3$ different from phase shifts $\Delta 1$, $\Delta 2$, and, moreover, provision may be made for spacing regions $M1_3$ to be absorbent; i.e., to have a reflectivity of R=0. As can be seen from FIG. 6a, the spacing regions $M1_3$ between the first and second areal measuring graduation regions $M1_1$, $M1_2$ have identical widths $P_{A1}$, $P_{A2}$ along the direction of longitudinal extent $R_{L1}$ and along the direction of transverse extent $R_{Q1}$, respectively.

Analogously to the previous example, FIG. 6b illustrates the filtering cross grating 531.1 of FIG. 6a in a partial cross-sectional view, with reference to which the layer structure will be described hereinafter. A substrate 531.1a made of, for example, Zerodur has disposed thereon a patterned reflective layer 531.1b formed of, for example, chromium (Cr), aluminum (Al) or gold (Au). In the second areal measuring graduation regions $M1_2$, the regions of substrate 531.1a that are covered by reflective layer 531.1b further have provided thereon a dielectric layer 531.1c, which may be made of, for example, silicon dioxide ($SiO_2$), tantalum pentoxide ($TaO_5$) or titanium dioxide ($TiO_2$).

Consequently, the cross grating variant shown in FIGS. 6a and 6b is not configured as a binary grating, but as a so-called "mixed amplitude/phase grating." This requires more manufacturing effort in terms of the number of required lithography steps as compared to the first cross grating variant described, but offers the possibility of suppressing unwanted higher diffraction orders in a particularly efficient manner.

Figure 7A:
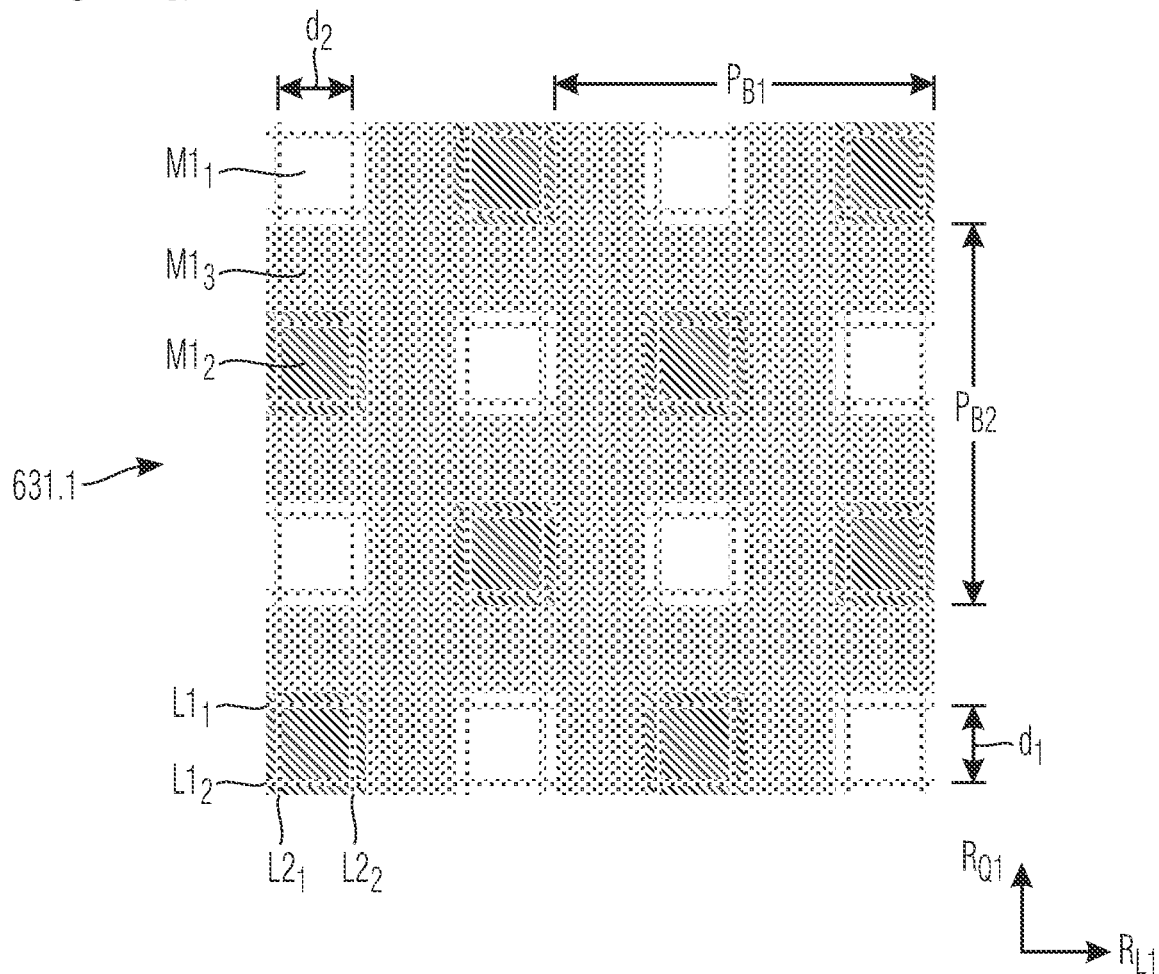
FIG. 7a is a plan view of a third variant of a suitable cross grating for the optical position-measuring device according to an embodiment of the invention.
Figure 7B:
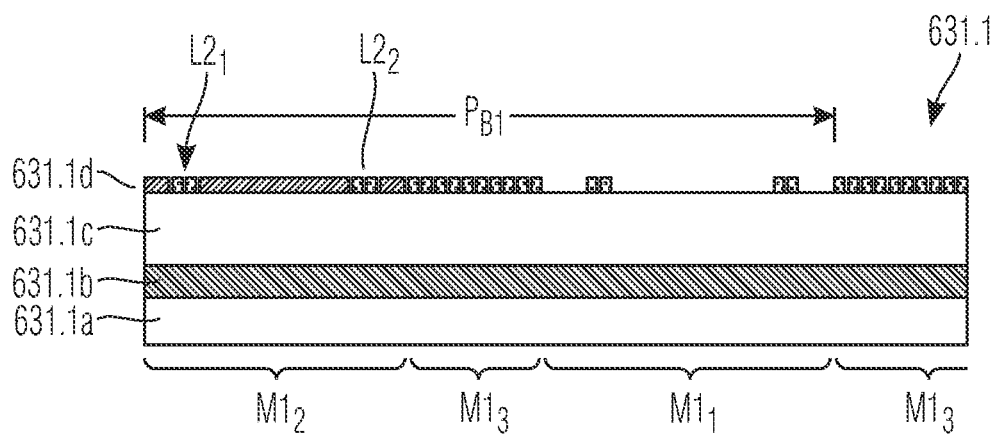
FIG. 7b is a partial cross-sectional view of the third variant of the cross grating.

A third variant of a suitable filtering cross grating 631.1 for the first measuring graduation is shown in the plan view in FIG. 7a and in a partial cross-sectional view in FIG. 7b. First, the basic grating design will be described below with reference to the plan view in FIG. 7a, and the grating structure with reference to FIG. 7b.

Again, this variant of cross grating 631.1 also has first and second areal measuring graduation regions $M1_1$, $M1_2$ which are arranged in a checkerboard-like pattern and have two different optional properties, a two-dimensional line grating having the grating lines $L1_1$, $L1_2$, $L2_1$, $L2_2$ being superimposed thereon, as in the example of FIG. 5a. Analogously to the previous example, additional spacing regions $M1_3$ are provided in this cross grating between the first and second areal measuring graduation regions $M1_1$, $M1_2$, the spacing regions $M1_3$ having a third optical property different from the optical properties of the first and second areal measuring graduation regions $M1_1$, $M1_2$. However, in contrast to the cross grating variant of FIGS. 6a, 6b, the spacing regions $M1_3$ between the first and second areal measuring graduation regions $M1_1$, $M1_2$ are patterned. As can be seen from FIG. 7a, there is provided, for example, a cross grating sub-pattern formed by square grating regions which are arranged periodically along the direction of longitudinal extent $R_{L1}$ and along the direction of transverse extent $R_{Q1}$ and have different optical properties.

Alternatively to the cross grating sub-pattern according to FIG. 7a, other pattern variants could also be provided in spacing regions $M1_3$. For example, it would also be possible to form therein so-called "high-frequency gratings" having very small grating periods and having a reflectivity of R=0 in spacing regions $M1_3$. It would also be possible to form therein diffraction gratings having only weak $0^{th}$ diffraction orders, so that a reflectivity of R=0 would result in spacing regions $M1_3$ in this manner as well.

Analogously to the previous examples, FIG. 7b, illustrates the filtering cross grating 631.1 of FIG. 7a in a partial cross-sectional view, with reference to which a possible layer structure of this variant will be described hereinafter. A reflective layer 631.1b, which may be made of chromium (Cr), aluminum (Al) or gold (Au), is disposed on a substrate 631.1a made of, for example, Zerodur or quartz glass over the entire surface area thereof. A dielectric layer 631.1c made of, for example, silicon dioxide ($SiO_2$) is provided thereabove over the entire surface area. Disposed thereabove is the patterned layer 631.1d, for which titanium dioxide ($TiO_2$), silicon, silicon nitride ($Si_3N_4$), chromium (Cr), or aluminum (Al) may be used.

In addition to the exemplary embodiments described, the position-measuring device according to other embodiments of the present invention may, of course, be embodied in various alternative forms.

For example, the first measuring graduation may also be configured as a transmission grating in the form of an amplitude grating, and not as a reflection grating as in the illustrated examples. In such a transmission amplitude grating, the different grating regions then have different transmission properties for the beams passing therethrough.

Moreover, it is possible that not only the first measuring graduation has the above-described filtering properties with respect to disturbing higher diffraction orders. Alternatively or additionally, the second measuring graduation may also be configured as a filter grating, and in particular as a filtering cross grating.

In further exemplary embodiments of the inventive position-measuring device, the second scale with the second measuring graduation may also be disposed such that it is tilted about its direction of longitudinal extent.

Finally, it is also possible that at least one of the measuring graduations used in the inventive position-measuring device may be configured as a so-called "polarization grating." The diffraction orders generated by such a polarization grating each have a defined polarization. For example, resulting $+/-1^{st}$ diffraction orders may be polarized orthogonally to each other. With regard to such polarization gratings, reference is made, for example, to EP 3 739 300 A1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical position-measuring device for determining a relative position of at least two scales, the optical position-measuring device comprising:
   a light source configured to emit an illumination beam along a scanning beam path; and
   the at least two scales, which are movable relative to each other along at least two measurement directions and disposed in different planes in crossed relation to each other, the at least two scales each having at least one measuring graduation having grating regions which are arranged periodically along at least one of the measurement directions and have different optical properties, each of the at least two scales having a direction of longitudinal extent oriented parallel to a first or a second one of the measurement directions; and
   a detector configured to generate one or more position-dependent scanning signals with respect to relative movement of the scales along the first or second measurement direction,
   wherein the scanning beam path is configured such that:
   at the first scale, the illumination beam is split into at least two sub-beams,
   the at least two sub-beams subsequently impinge on the second scale and are reflected back toward the first scale, and
   the reflected-back sub-beams strike the first scale again, where the reflected-back sub-beams are recombined, so that at least one resulting signal beam subsequently propagates toward the detector,
   wherein the at least one measuring graduation of at least one of the scales is configured as a two-dimensional cross grating which has a filtering effect that suppresses disturbing higher diffraction orders at the cross grating, and
   wherein the cross grating has first and second areal measuring graduation regions which are arranged in a checkerboard-like pattern and have different optical properties and which are arranged periodically with a first regional periodicity along a direction of longitudinal extent of the cross grating and periodically with a second regional periodicity along a direction of transverse extent of the cross grating that is oriented orthogonally to the direction of longitudinal extent, the first and second areal measuring graduation regions having superimposed thereon a one-dimensional or two-dimensional periodic line grating.

2. The optical position-measuring device as recited in claim 1, wherein in each areal measuring graduation region, the line grating has a line grating region which:
   includes at least a first pair of straight grating lines which extend over an entire length of the respective areal measuring graduation region and are arranged parallel to a first one of the directions of extent at a first distance relative to each other, the line grating region along the first direction of extent having same periodicities as the respective areal measuring graduation region, and in a case of a two-dimensional line grating, further includes a second pair of straight grating lines which extend over the entire length of the respective areal measuring graduation region and are arranged along a second one of the directions of extent, which is oriented perpendicular to the first direction of extent, at a second distance relative to each other, the line grating region along the second direction of extent also having same periodicities as the respective areal measuring graduation region.

3. The optical position-measuring device as recited in claim 2, wherein at least three regions separated from one another by the grating lines are present in each of the areal measuring graduation regions along the first direction of extent and/or along the second direction of extent.

4. The optical position-measuring device as recited in claim 1, wherein the different optical properties provided in the cross grating are:
different transmission properties,
different reflective properties, and/or
different phase-shifting effects.

5. The optical position-measuring device as recited in claim 1, wherein the cross grating is configured as a binary grating having two different optical properties, and the grating lines of the line grating in each case have a respective other optical property with respect to the optical properties of the first and second areal measuring graduation regions.

6. The optical position-measuring device as recited in claim 1, wherein the cross grating has spacing regions between the first and second areal measuring graduation regions, the spacing regions having a third optical property different from the optical properties of the first and second areal measuring graduation regions.

7. The optical position-measuring device as recited in claim 6, wherein the spacing regions between the first and second areal measuring graduation regions have identical widths along the direction of longitudinal extent and the direction of transverse extent.

8. The optical position-measuring device as recited in claim 6, wherein the spacing regions are patterned.

9. The optical position-measuring device as recited in claim 1, wherein the measuring graduation of the second scale is configured as a reflective linear grating having measuring graduation regions which are arranged periodically along the direction of longitudinal extent of the second scale and which have different phase-shifting effects on the beams reflected thereby.

10. The optical position-measuring device as recited in claim 9, wherein the linear grating of the second scale has a filtering effect that suppresses certain diffraction orders $n>1$.

11. The optical position-measuring device as recited in claim 1, wherein at least one of the measuring graduations is further configured such that diffraction orders generated thereby each have a defined polarization.

12. The optical position-measuring device as recited in claim 1, wherein at least one of the scales is disposed tilted about its direction of longitudinal extent.

13. An arrangement, comprising:
a plurality of optical position-measuring devices, each of the optical position-measuring devices comprising:
a light source configured to emit an illumination beam along a scanning beam path; and
at least two scales, which are movable relative to each other along at least two measurement directions and disposed in different planes in crossed relation to each other, the at least two scales each having at least one measuring graduation having grating regions which are arranged periodically along at least one of the measurement directions and have different optical properties, each of the at least two scales having a direction of longitudinal extent oriented parallel to a first or a second one of the measurement directions; and
a detector configured to generate one or more position-dependent scanning signals with respect to relative movement of the scales along the first or second measurement direction,
wherein the scanning beam path is configured such that:
at the first scale, the illumination beam is split into at least two sub-beams,
the at least two sub-beams subsequently impinge on the second scale and are reflected back toward the first scale, and
the reflected-back sub-beams strike the first scale again, where the reflected-back sub-beams are recombined, so that at least one resulting signal beam subsequently propagates toward the detector, and
wherein the at least one measuring graduation of at least one of the scales is configured as a two-dimensional cross grating which has a filtering effect that suppresses disturbing higher diffraction orders at the cross grating; and
a stage disposed in a horizontal plane of movement in such a manner that the stage is movable along two orthogonal ones of the measurement directions,
wherein two of the first scales of two of the optical position-measuring devices are disposed at opposite sides of the stage,
wherein at least one of the second scales of at least one of the optical position-measuring devices is disposed crosswise at an angle of 90° and stationary with respect to the two first scales in a plane that is spaced apart from the horizontal plane of movement along a direction that is oriented orthogonally to the horizontal plane of movement, and
wherein each of the plurality of the optical position-measuring devices include a scanning unit, which includes the light source and the detector, the scanning units being disposed stationarily adjacent to the opposite sides of the stage with the respective first scales.

14. The arrangement as recited in claim 13, wherein:
the two first scales each have a reflective measuring graduation in a form of a two-dimensional cross grating, which are disposed such that the two first scales are tilted about their respective directions of longitudinal extent with respect to the horizontal plane of movement, and
the at least one of the second scales has at least two reflective measuring graduations in two parallel tracks that extend parallel to the direction of longitudinal extent, the at least two reflective measuring graduations being configured as reflective linear gratings having graduation regions which are arranged periodically along the respective direction of longitudinal extent, and the grating planes of the reflective measuring graduations being oriented parallel to the horizontal plane of movement.

15. The arrangement as recited in claim 13, wherein the cross grating has first and second areal measuring graduation regions which are arranged in a checkerboard-like pattern and have different optical properties and which are arranged periodically with a first regional periodicity along a direction of longitudinal extent of the cross grating and periodically with a second regional periodicity along a direction of transverse extent of the cross grating that is oriented orthogonally to the direction of longitudinal extent, the first and second areal measuring graduation regions having superimposed thereon a one-dimensional or two-dimensional periodic line grating.

16. An optical position-measuring device for determining a relative position of at least two scales, the optical position-measuring device comprising:
   a light source configured to emit an illumination beam along a scanning beam path; and
   the at least two scales, which are movable relative to each other along at least two measurement directions and disposed in different planes in crossed relation to each other, the at least two scales each having at least one measuring graduation having grating regions which are arranged periodically along at least one of the measurement directions and have different optical properties, each of the at least two scales having a direction of longitudinal extent oriented parallel to a first or a second one of the measurement directions; and
   a detector configured to generate one or more position-dependent scanning signals with respect to relative movement of the scales along the first or second measurement direction,
   wherein the scanning beam path is configured such that:
   at the first scale, the illumination beam is split into at least two sub-beams,
   the at least two sub-beams subsequently impinge on the second scale and are reflected back toward the first scale, and
   the reflected-back sub-beams strike the first scale again, where the reflected-back sub-beams are recombined, so that at least one resulting signal beam subsequently propagates toward the detector,
   wherein the at least one measuring graduation of at least one of the scales is configured as a two-dimensional cross grating which has a filtering effect that suppresses disturbing higher diffraction orders at the cross grating,
   wherein the cross grating has first and second areal measuring graduation regions, and
   wherein the cross grating is configured as a binary grating having two different optical properties, and the grating lines of the line grating in each case have a respective other optical property with respect to optical properties of the first and second areal measuring graduation regions.

17. The optical position-measuring device as recited in claim 16, wherein the measuring graduation of the second scale is configured as a reflective linear grating having measuring graduation regions which are arranged periodically along the direction of longitudinal extent of the second scale and which have different phase-shifting effects on the beams reflected thereby.

18. The optical position-measuring device as recited in claim 17, wherein the linear grating of the second scale has a filtering effect that suppresses certain diffraction orders $n>1$.

19. The optical position-measuring device as recited in claim 16, wherein at least one of the measuring graduations is further configured such that diffraction orders generated thereby each have a defined polarization.

20. The optical position-measuring device as recited in claim 16, wherein at least one of the scales is disposed tilted about its direction of longitudinal extent.

* * * * *